(12) United States Patent
Fukuzawa et al.

(10) Patent No.: US 7,878,594 B2
(45) Date of Patent: Feb. 1, 2011

(54) SEAT RECLINING DEVICE

(75) Inventors: Satoru Fukuzawa, Toin (JP); Hiroshi Niwa, Toin (JP); Toshiaki Kato, Toin (JP)

(73) Assignee: NTN Corporation, Osaka (JP)

( * ) Notice: Subject to any disclaimer, the term of this patent is extended or adjusted under 35 U.S.C. 154(b) by 312 days.

(21) Appl. No.: 12/224,888

(22) PCT Filed: Mar. 9, 2007

(86) PCT No.: PCT/JP2007/054693

§ 371 (c)(1),
(2), (4) Date: Oct. 6, 2008

(87) PCT Pub. No.: WO2007/105643

PCT Pub. Date: Sep. 20, 2007

(65) Prior Publication Data

US 2009/0295210 A1 Dec. 3, 2009

(30) Foreign Application Priority Data

Mar. 10, 2006 (JP) .............................. 2006-066341
May 30, 2006 (JP) .............................. 2006-150039
Feb. 9, 2007 (JP) .............................. 2007-030655
Feb. 13, 2007 (JP) .............................. 2007-032380

(51) Int. Cl.
*B60N 2/02* (2006.01)

(52) U.S. Cl. .................................. 297/362; 297/362.12

(58) Field of Classification Search ............ 297/362.12, 297/362.14, 362
See application file for complete search history.

(56) References Cited

U.S. PATENT DOCUMENTS 3,723,165 A * 3/1973 Longo et al. ................. 427/447

(Continued)

FOREIGN PATENT DOCUMENTS

EP 1642788 * 4/2006
JP 63-303048 12/1988

(Continued)

OTHER PUBLICATIONS

International Search Report issued May 22, 2007, in the International (PCT) Application of which the present application is the U.S. National Stage.

*Primary Examiner*—David Dunn
*Assistant Examiner*—Erika Garrett
(74) *Attorney, Agent, or Firm*—Wenderoth, Lind & Ponack, L.L.P.

(57) ABSTRACT

The object is to provide a reclining device for a seat such as an automotive seat including a differential transmission mechanism (Taumel mechanism) which makes it possible to eliminate precision machining of the inner surface of an external gear into which a slide bearing is pressed, in which the freedom of design of the reclining device is not restricted by the standards of a bearing bush, and which can be manufactured at a low cost. The reclining device includes a differential transmission mechanism for adjusting the opening angle of a hinge through which the seating portion and the backrest portion of the seat are coupled together. The differential transmission mechanism includes an internal gear and an external gear having a slightly smaller number of teeth than the internal gear and meshing with the internal gear. An arcuate gap is defined between a shaft hole of the external gear and a small-diameter portion of a cam integral with a shaft of the internal gear. A pair of wedge-shaped pieces and are received in the arcuate gap such that their narrow ends and face in opposite directions to each other. At least the outer surfaces and of the wedge-shaped pieces and, which serve as frictional contact surfaces when the wedge-shaped pieces and are pushed by the cam integral with the shaft of the internal gear and slide in the arcuate gap, are each made of a low-friction sliding material.

15 Claims, 3 Drawing Sheets

U.S. PATENT DOCUMENTS

| | | | |
|---|---|---|---|
| 4,103,970 A * | 8/1978 | Homier | 297/363 |
| 4,958,530 A * | 9/1990 | Jaseck et al. | 74/7 A |
| 5,069,937 A * | 12/1991 | Wall | 427/455 |
| 5,154,475 A * | 10/1992 | Kafitz | 297/362 |
| 5,312,158 A | 5/1994 | Wittig et al. | |
| 5,634,689 A * | 6/1997 | Putsch et al. | 297/362 |
| 6,283,886 B1 * | 9/2001 | Schumann | 475/162 |
| 6,577,039 B2 * | 6/2003 | Ishida et al. | 310/300 |

FOREIGN PATENT DOCUMENTS

| | | |
|---|---|---|
| JP | 3-237904 | 10/1991 |
| JP | 5-211925 | 8/1993 |
| JP | 10/120980 | 5/1998 |
| JP | 2004-033401 | 2/2004 |

* cited by examiner

SEAT RECLINING DEVICE

TECHNICAL FIELD

This invention relates to a reclining device for a seat and more specifically to a seat reclining device suitable as a reclining device for a seat for a motor vehicle.

BACKGROUND ART

A seat reclining device is known which includes a gear differential transmission mechanism for adjusting the opening angle of a hinge through which the seating portion and the backrest portion are coupled together, whereby the inclination angle of the backrest of the seat is adjustable.

Figure 1:
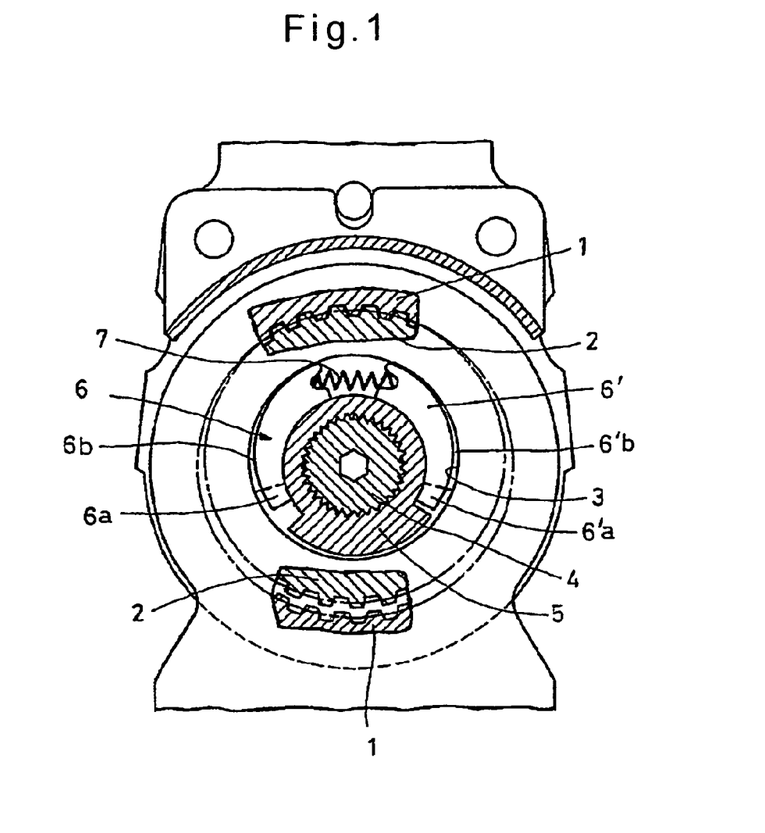
FIG. 1 is a partially cutaway sectional view of a reclining device of a first embodiment.
Figure 5:
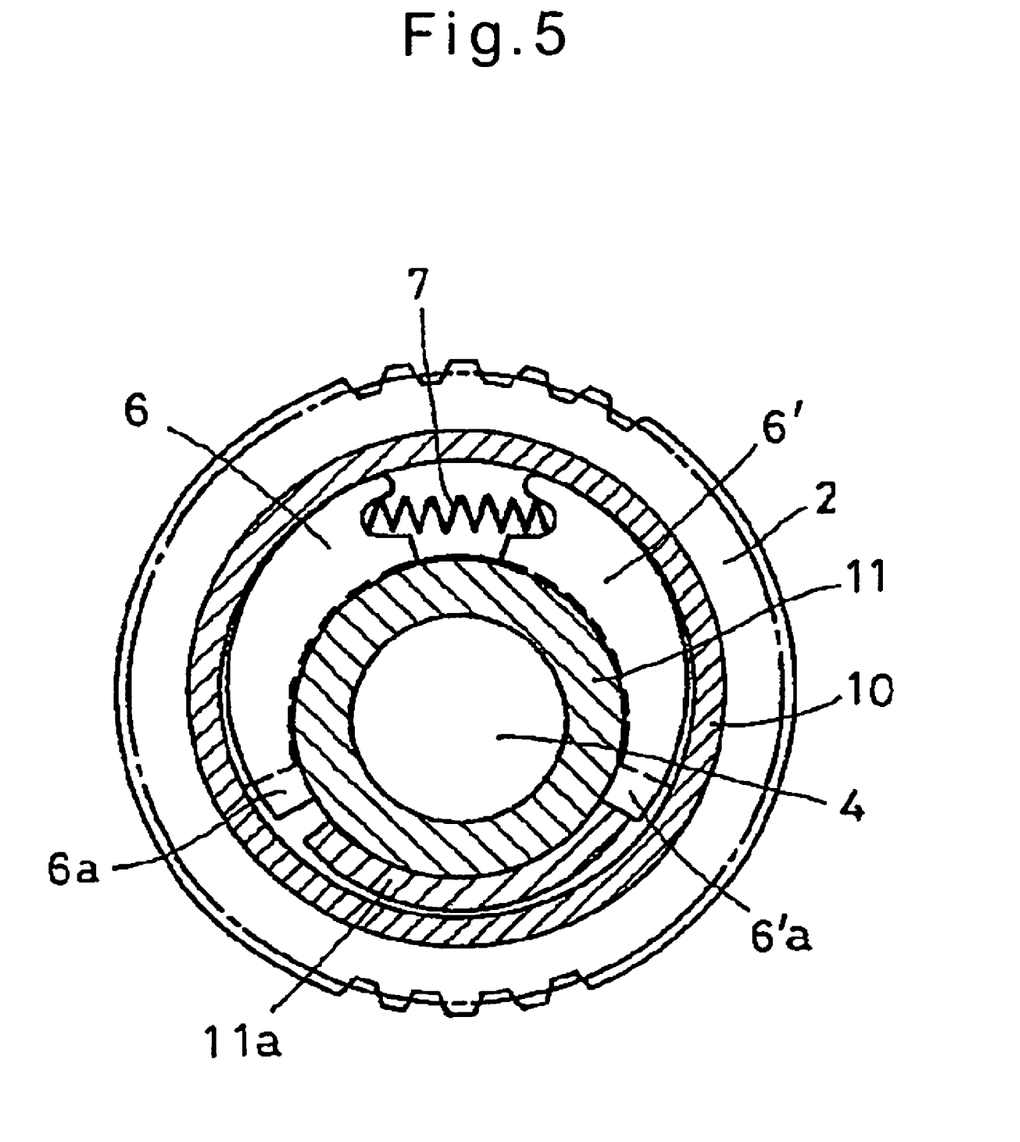
FIG. 5 is a partially cutaway sectional view of a portion of a conventional reclining device.

A gear differential transmission mechanism in a conventional seat reclining device is described mainly with reference to FIG. 5 and partly with reference to FIG. 1. In this arrangement, the hinge through which the seating portion and the backrest of the seat are coupled together is provided with the gear differential transmission mechanism.

This differential transmission mechanism includes an internal gear 1 (see FIG. 1), and an external gear 2 having a smaller number of teeth than the internal gear and meshing with the internal gear. An arcuate gap is defined between a ring-shaped bearing bush 10 and a shaft 4 of the internal gear 1 and its slide bearing 11. A pair of wedge-shaped pieces 6 and 6' are received in the arcuate gap such that their respective narrow ends 6a and 6'a face in opposite directions to each other. A compression coil spring 7 is also received in the arcuate gap and biases the wedge-shaped pieces away from each other.

In this arrangement, when the wedge-shaped pieces 6 and 6' slide in the arcuate gap by operating the slide bearing 11 and its protrusion 11a, the external gear 2 is configured to separate from the internal gear 1, thereby making it possible to adjust the inclination angle of the backrest.

Such a differential transmission mechanism is also known as a Taumel mechanism. A reclining seat device for an automotive seat including this mechanism is provided with the bearing bush 10 in the external gear 2 as described above. The wedge-shaped pieces 6 and 6' are configured to be brought into frictional sliding contact with the bearing bush 10 (Patent documents 1 and 2).

In the reclining device of the type in which the wedge-shaped pieces 6 and 6' are brought into frictional sliding contact with the bearing bush 10, it was necessary to press the bearing bush 10 into the external gear 2 for smooth movement of the wedge-shaped pieces 6 and 6'.

Figure 4:
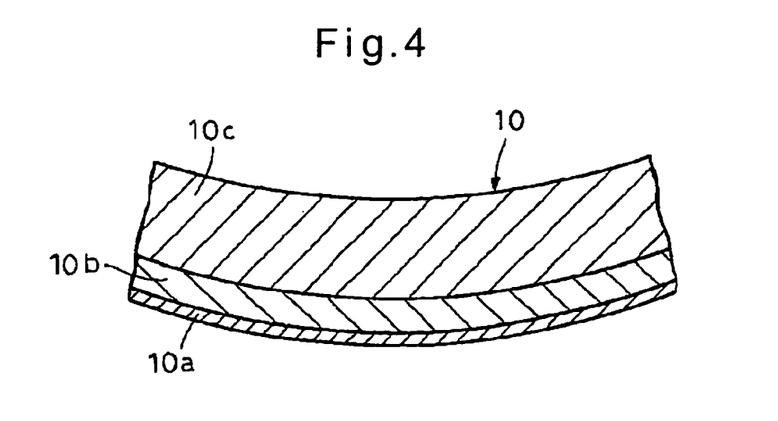
FIG. 4 is an enlarged sectional view of a bearing bush.

Such a bearing bush 10 has a sliding surface made of a resin having good sliding properties, and is sometimes also called a winding bush. It has e.g. a laminate structure as shown in FIG. 4. That is, the bush shown in FIG. 4 is a laminated slide bearing comprising a back metal plate 10a, a porous sintered layer 10b superposed on the back metal plate, and a resin layer 10c comprising a resin composition having sliding properties and partially filling the pores of the porous sintered layer 10b.

Patent document 1: JP Patent publication 3-237904A

Patent document 2: JP Patent publication 2004-33401A

DISCLOSURE OF THE INVENTION

Object of the Invention

In a conventional reclining device for a seat such as an automotive seat, it is necessary to accurately form the inner surface of the external gear into which the bearing bush is pressed in order to prevent deformation of the bearing surface of the bearing bush when the bearing bush is pressed into the external gear.

In this case, as the bearing bush, it is preferable to use a bearing bush of the laminated structure as described above. But because commercially available such bearing bushes of the laminated structure have predetermined standard dimensions, use of such commercially available bearing bushes will restrict the freedom of design of the reclining device.

But custom-ordered bearing bushes of the laminated structure having dimensions other than the predetermined standard dimensions are prohibitively expensive and reclining devices including such bearing bushes are actually commercially non-competitive.

A first object of the present invention is therefore to provide a reclining device for a seat such as an automotive seat including a differential transmission mechanism (Taumel mechanism) which needs no bearing bush inside the external gear, and thus makes it possible to omit precision machining of the inner periphery of the external gear into which a bearing bush is pressed, of which the freedom of design is not restricted by the standards of a commercial bearing bush, and which can be manufactured at a low cost.

The abovementioned conventional reclining devices for seats such as automotive seats had also a problem that when the wedge-shaped pieces slide, they are repeatedly brought into frictional contact with the resin layer of the bearing bush, so that the resin layer tends to peel off.

Therefore, a further object of the present invention is to provide a reclining device for a seat such as an automotive seat including a differential transmission mechanism (Taumel mechanism) which includes an external teeth having a bearing bush, which can be used for a prolonged period of time, of which the resin layer of the bearing bush of the external gear is less likely to peel off the surface and is also free of delamination, and which is sufficiently durable.

Means to Achieve the Object

In order to achieve this object, the present invention provides a seat reclining device comprising a differential transmission mechanism for adjusting the opening angle of a hinge through which a seating portion and a backrest portion of a seat are coupled together, the differential transmission mechanism comprising an internal gear, an external gear having a smaller number of teeth than the internal gear and meshing with the internal gear 1, the external gear having a shaft hole and the internal gear having a shaft, the shaft hole and the shaft defining an arcuate gap therebetween, a pair of wedge-shaped pieces received in the arcuate gap such that their narrow ends face in opposite directions to each other, a spring received in the arcuate gap and biasing the wedge-shaped pieces away from each other, whereby when the wedge-shaped pieces are pushed by a cam provided on the shaft of the internal gear and slide in the arcuate gap, the external gear is configured to separate from the internal gear, thereby making it possible to adjust the opening angle of the hinge, characterized in that each of the wedge-shaped pieces has a friction sliding surface made of a low-friction sliding material.

In the seat reclining device according to the present invention, because the frictional sliding contact surface of each wedge-shaped piece is made of a low-friction sliding material, when the wedge-shaped pieces slide in the arcuate gap, the inner peripheral surface of the shaft hole of the external gear contacts the outer peripheral surface of the shaft of the internal gear through the low-friction sliding material.

This eliminates the necessity to press, beforehand, a bearing bush or a slide bearing into the inner peripheral surface of the shaft hole of the external gear or onto the outer peripheral surface of the shaft of the internal gear, thereby eliminating the necessity to accurately finish the inner surface of the external gear into which the bearing bush is pressed. It is also not necessary to mount a separate slide bearing on the outer periphery of the shaft of the internal gear.

Further, since it is unnecessary to use a conventional bearing bush of the laminated structure having standard dimensions, it is possible to improve the freedom of design of the reclining device.

In particular, with the arrangement in which the friction sliding surface of each of the wedge-shaped pieces is formed by integrally laminating the low-friction sliding material on each wedge-shaped piece through an intermediate layer, it is possible to integrally and strongly laminate the low-friction sliding material on the substrate even if the direct bond strength between the substrate and the low-friction sliding material is low, by properly selecting the physical properties of the intermediate layer.

In order to improve adhesion when the low-friction sliding material is integrally laminated on the substrate, the intermediate layer is preferably a flame-sprayed metal layer. A flame-retardant metal layer is porous on the surface, so that the low-friction sliding material is effectively anchored to this layer. The thus obtained laminated structure is high in the interlayer adhesion.

By forming the low-friction sliding material, which is made e.g. of a resin, over each wedge-shaped piece through the intermediate layer, the adhesion between the low-friction sliding material and the substrate improves. In particular, by using a flame-sprayed metal intermediate layer, it is possible to further improve the adhesion between the low-friction sliding material and the substrate.

Preferably, the flame-sprayed metal layer is made of a soft metal such as a copper alloy. With this arrangement, even after the low-friction sliding member has become worn out, the intermediate layer never abrade the mating member, which in turn makes it possible to maintain lubricating properties. Also, because a soft metal such as a copper alloy has a high thermal conductivity, even if the wedge-shaped pieces should become worn abnormally, the wedge-shaped pieces are never heated to an abnormally high temperature.

Preferably, the low-friction sliding material is a resin having a low friction coefficient and formed into a film, because such a low-friction sliding material is easy to form.

In particular, such a resin film is preferably made of a fluorine-series resin. For example, a fluororesin film comprising a binder resin to which a fluororesin is added is preferable because such a film has excellent low-friction properties. As the fluororesin film, a fluororesin film containing at least one solid lubricant selected from graphite, molybdenum disulfide and metal oxides is also preferable because it has high wear resistance and peel resistance.

Preferably, the fluororesin film is made of a fluororesin composition comprising 100 parts by weight of a fluororesin, 60 to 130 parts by weight of a binder resin, and 5 to 30 parts by weight of at least one selected from graphite, molybdenum and metal oxides. Such a fluororesin film has particularly excellent low-friction properties, wear resistance and peel resistance.

In order to achieve the abovementioned second object, the above seat reclining device further comprises a bearing bush having a sliding surface made of a resin and fixed to the shaft hole of the external gear, with the frictional sliding contact surface of each wedge-shaped piece being made of the above-described low-friction sliding material.

In the seat reclining device according to the present invention, because the frictional sliding contact surface of each wedge-shaped piece is made of a low-friction sliding material, when the wedge-shaped pieces slide in the arcuate gap, they contact the resin layer of the bearing bush received in the inner periphery of the shaft hole of the external gear and the outer periphery of the shaft of the internal gear through the low-friction sliding material.

Thus, the frictional force applied from each wedge-shaped piece to the resin layer of the bearing bush received in the inner periphery of the shaft hole of the external gear is small compared to conventional arrangements. This in turn reduces the force that tends to peel off the surface of the resin layer of the bearing bush, and also minimizes peeling inside the layer (delamination).

In the arrangement in which the friction sliding surface of each of the wedge-shaped pieces is formed by integrally laminating the low-friction sliding material on each wedge-shaped piece through the intermediate layer, it is possible to integrally and strongly laminate the low-friction sliding material on the substrate even if the direct bond strength between the substrate and the low-friction sliding material is low, by properly selecting the physical properties of the intermediate layer. Thus, the wedge-shaped pieces can be reliably brought into contact with the resin layer of the bearing bush through the low-friction sliding material for a prolonged period of time.

The abovementioned advantages are particularly remarkable where the abovementioned reclining device is one for an automotive seat.

Advantages of the Invention

According to this invention, in a seat reclining device including a differential transmission mechanism for adjusting the opening angle of the hinge through which the seating portion and the backrest portion of the seat are coupled together, since the frictional sliding contact surface of each wedge-shaped piece is made of a low-friction sliding material, the wedge-shaped pieces contact the inner periphery of the shaft hole of the external gear and the outer periphery of the shaft of the internal gear always through the low-friction sliding material. Thus, it is not necessary to provide, beforehand, a bearing bush on any part that is brought into frictional sliding contact with the wedge-shaped pieces. This in turn eliminates the necessity for precision machining of the inner surface of the external gear into which a bearing bush is pressed, as necessary in the prior art. Also, the freedom of design is not restricted by the standards of a commercial bearing bush. Thus, the reclining device for a seat such as an automotive seat can be manufactured at a low cost.

In particular, with the arrangement in which the friction sliding surface of each of the wedge-shaped pieces is formed by integrally laminating the low-friction sliding material on each wedge-shaped piece through an intermediate layer such as a flame-sprayed metal layer, it is possible to integrally and strongly laminate the low-friction sliding material on the substrate even if the direct bond strength between the substrate and the low-friction sliding material is low, by properly selecting the physical properties of the intermediate layer.

By forming the low-friction sliding material such as a fluororesin on each wedge-shaped piece through the intermediate layer, it is possible to increase the adhesion between the low-friction sliding material and the substrate. Particularly if the intermediate layer is a flame-sprayed metal layer, the low-friction sliding material of each wedge-shaped piece can be reliably and strongly bonded to the substrate.

In particular, in the arrangement in which the intermediate layer is a flame-sprayed metal layer, the low-friction sliding material can be reliably and strongly bonded to the substrate.

According to the present invention, in the seat reclining device, since the frictional sliding contact surface of each wedge-shaped piece is made of a low-friction sliding material, the wedge-shaped pieces contact the bearing bush received in the shaft hole of the external gear through the low-friction sliding material. This minimizes peeling of the resin layer of the bearing bush, thereby improving the durability of the differential transmission mechanism (Taumel mechanism) of the reclining device for e.g. an automotive seat.

DESCRIPTION OF THE NUMERALS

1. Internal gear
2. External gear
3. Shaft hole
4. Shaft
5. Cam
6, 6'. Wedge-shaped piece
6a, 6'a. Narrow end
6c. Inner surface
6d. Front end surface
6e. Spring retaining surface
6f. Front (back) surface
7. Compression coil spring
10. Bearing bush
10a. Back metal plate
10b. Porous sintered layer
10c. Resin layer
11. Slide bearing
11a. Protrusion

BEST MODE FOR EMBODYING THE INVENTION

The embodiments of this invention are described with reference to the accompanying drawings.

Figure 2:
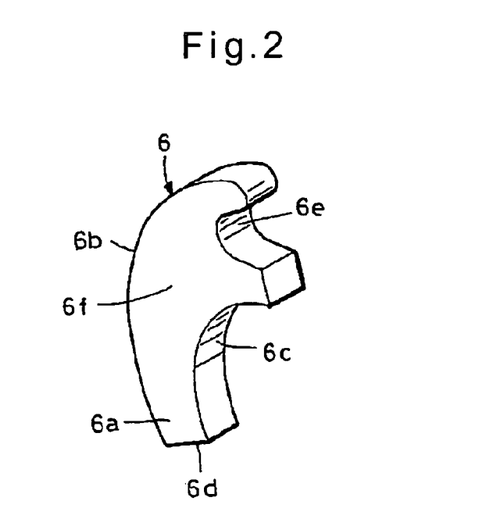
FIG. 2 is a perspective view of a wedge-shaped piece.

As shown in FIGS. 1 and 2, the first embodiment is a reclining device having a differential transmission mechanism for adjusting the opening angle of a hinge through which the seating portion and the backrest portion of a seat are coupled together. The differential transmission mechanism includes an internal gear 1, and an external gear 2 having a slightly smaller number of teeth than the internal gear 1 and meshing with the internal gear 1. An arcuate gap is defined between a shaft hole 3 of the external gear 2 and a small-diameter portion of a cam 5 that is integral with a shaft 4 of the internal gear 1. A pair of wedge-shaped pieces 6 and 6' are received in the arcuate gap such that their narrow ends 6a and 6'a face in opposite directions. A compression spring 7 is also received in the arcuate gap which biases the wedge-shaped pieces 6 and 6' away from each other. When the wedge-shaped pieces 6 and 6' are pushed by the cam 5 and slide in the arcuate gap, the external gear 2 disengages from the internal gear 1. In this state, it is possible to adjust the opening angle of the hinge. The radially outer surfaces 6b and 6'b of the wedge-shaped pieces 6 and 6', which serve as friction sliding surfaces, are made of a low-friction sliding material.

The relationship between the number of teeth of the external gear 2 and that of the internal gear 1 is not particularly limited, provided the former is at least one smaller than the latter. Just as examples, the former may be smaller than the latter by 1 to 10, preferably by about 2 to 5, and normally by about 1 to 3.

The wedge-shaped pieces 6 and 6' are not particularly limited in design, such as detailed shapes of the entire pieces and the degree of bending, provided each piece has a narrow end 6a.

In the drawings, the spring biasing the two wedge-shaped pieces 6 and 6' away from each other is a compression spring. But it may be a partially cut-out ring-shaped spring, a damper, a rubber member, an elastic resin member or any other known elastic component.

As for the friction sliding surface of the wedge-shaped piece 6, its radially outer surface 6b, which is brought into sliding contact with the shaft hole 3 of the external gear 2, and its radially inner surface 6c, which is brought into sliding contact with the cam 5, which is integral with the shaft 4 of the internal gear 1, are main friction sliding surfaces. In particular, high wear resistance is required for the radially outer surface 6b. A low-friction sliding material may also be formed on at least one of the other surfaces comprising the front end surface 6d, spring retaining recess 6e and a pair of opposed front (back) surfaces 6f.

A film of a low-friction sliding material can be formed on a friction sliding surface or surfaces of the wedge-shaped pieces 6 and 6' by applying a low-friction sliding material comprising a resin to a portion or the entirety of each piece by immersing or spraying, and drying it or drying and heat-curing it.

Ordinarily, the wedge-shaped pieces 6 and 6' are made of a metal. Especially if they are made of a ferrous sintered material, the adhesion properties of the low-friction sliding film comprising a resin and applied to the surface of each piece improve.

Low-friction sliding materials usable in the present invention include what is known as solid lubricants, including molybdenum disulfide, graphite, carbon, fluororesin and any other known low-friction material.

Among them, fluororesin is especially preferable because it has high low friction properties, is resistant to seizure and inexpensive.

Fluororesins usable are those having heat resistance sufficient to withstand frictional heat, such as PTFE, tetrafluoro-ethylene-hexafluoro-propylene copolymer, tetrafluoro-ethylene-perfluoroalkylvinylether copolymer, tetrafluoro-ethylene-ethylene copolymer, polychlorotrifluoro-ethylene or ethylene-chlorotrifluoroethylene copolymer, a combination of two of more of these copolymers, or a tripolymer.

Among them, PTFE is preferable because it is the most heat-resistant fluororesin, and shows excellent sliding properties at normal temperature. Among PTFEs, it is preferable to use lubricant-class powdered PTFE. Commercially available lubricant-class powdered PTFE includes Polyflon M15 and Lubron L-2 (Trade names; both made by Daikin Industries, Ltd.), TLP-10 (Trade name; made by Du Pont-Mitsui Fluorochemicals Company, Ltd.), and Fluon G163 (Trade name; made by Asahi Glass Co., Ltd.). Such lubricant-class powdered PTFE refers to recycled PTFE made by pulverizing baked PTFE, or PTFE powder made by irradiating PTFE with gamma rays to reduce its molecular weight. Commercially available gamma-ray-irradiated PTFE includes KT400H (Trade name; made by Kitamura Limited).

PTFE may be in the form of powder for molding, or what is called fine powder for solid lubricants. Its average particle diameter is preferably 0.1 to 20 μm, more preferably 0.2 to 10 μm. By limiting the average particle diameter within this range, PTFE is less likely to aggregate in the coating agent, and is dispersed uniformly in the film.

By using a binder resin with the fluororesin film, it is possible to improve the wear resistance and peel resistance. Such a binder resin is strongly bonded to sintered wedge-shaped pieces as substrates without thermally deteriorating the fluororesin film, and also serves to bind powdered fluororesin and other ingredients. Such a binder resin may be a polyimide-series resin, epoxy-series resin, phenolic resin, silicone-series resin, etc. Among them, a polyimide-series resin has the highest heat resistance and bond strength.

Specific polyimide-series resins include polyimide resin (PI), polyamideimide resin (PAI), polyesterimide resin and polyester-amide-imide resin. Among them, PI and PAI are suitable. Further, aromatic polyimide resins and aromatic polyamideimide resins are especially preferable, of which imide bonds or amide bonds are bonded together through aromatic groups.

PAI is a resin having imide bonds and amide bonds. The imide bonds in an aromatic polyamideimide resin may be precursors such as polyamide acids, closed imide rings, or a mixture thereof. Such aromatic polyamideimide resins include ones produced from an aromatic primary diamine (such as diphenylmethanediamine) and an aromatic tribasic anhydride (such as a mono- or diacyl halide derivative of trimellitate anhydride), and ones produced from an aromatic diisocyanate compound (such as diphenylmethane diisocyanate) and an aromatic tribasic anhydride. As PAIs of which the imide bond content is larger than the amide bond content, there are ones produced from an aromatic, aliphatic or alicyclic diisocyanate compound, aromatic tetrabasic dianhydride, and aromatic tribasic anhydride. Any of these PAIs is usable.

The fluororesin film may contain other known ingredients used for fluororesin films. In particular, it preferably contains graphite, molybdenum disulfide and metal oxides such as iron oxide, titanium oxide, magnesium oxide, or aluminum oxide for improved wear resistance of the film.

For improved adhesiveness to the sintered wedge-shaped pieces as substrates and for improved wear resistance of the film, the fluororesin film is preferably made of a fluororesin composition comprising 100 parts by weight of a fluororesin, 60 to 130 parts by weight of a binder resin, and 5 to 30 parts by weight of at least one solid lubricant selected from graphite, molybdenum disulfide and metal oxides. If the content of the binder resin is less than 60 parts by weight based on 100 parts by weight of the fluororesin, the adhesiveness will be low. If the content of the binder resin is over 130 parts by weight, the low-friction properties will deteriorate. If the total content of graphite, molybdenum disulfide, metal oxides, etc. is less than 5 parts by weight based on 100 parts by weight of the fluororesin, the wear resistance will be insufficient. If this content is over 30 parts by weight, the adhesiveness deteriorates.

The low-friction sliding material provided on the friction sliding surface of each wedge-shaped piece according to the present invention may be formed over the substrate, which may be made of e.g. a sintered metal, through an intermediate layer to improve the bond strength between the substrate in the form of a wedge-shaped piece and the low-friction sliding material. The intermediate layer is not particularly limited, provided it is formed with fine protrusions and recesses on the surface. But preferably, such an intermediate layer is formed by flame spraying because such a layer serves to minimize the thickness of the film and improve the anchor effect.

In particular, by using a flame-sprayed layer of a metal comprising a soft metal such as copper, nickel or aluminum as the intermediate layer, even if the low-friction sliding material becomes worn out, such an intermediate layer would not damage the mating member.

In an alternative method for providing a low-friction sliding material on the friction sliding surface of each wedge-shaped piece according to the present invention, a rough surface having a "surface roughness" of preferably Ra 1 to 15 μm, more preferably Ra 2 to 10 μm is formed on the surface of a substrate made of e.g. ferrous sintered metal by subjecting the substrate surface to shot peening, and a fluororesin film is bonded to the rough surface. With this arrangement, it is possible to reduce the cost while maintaining required performance. The surface roughness Rz is within the range of 5 to 50 μm.

Figure 3:
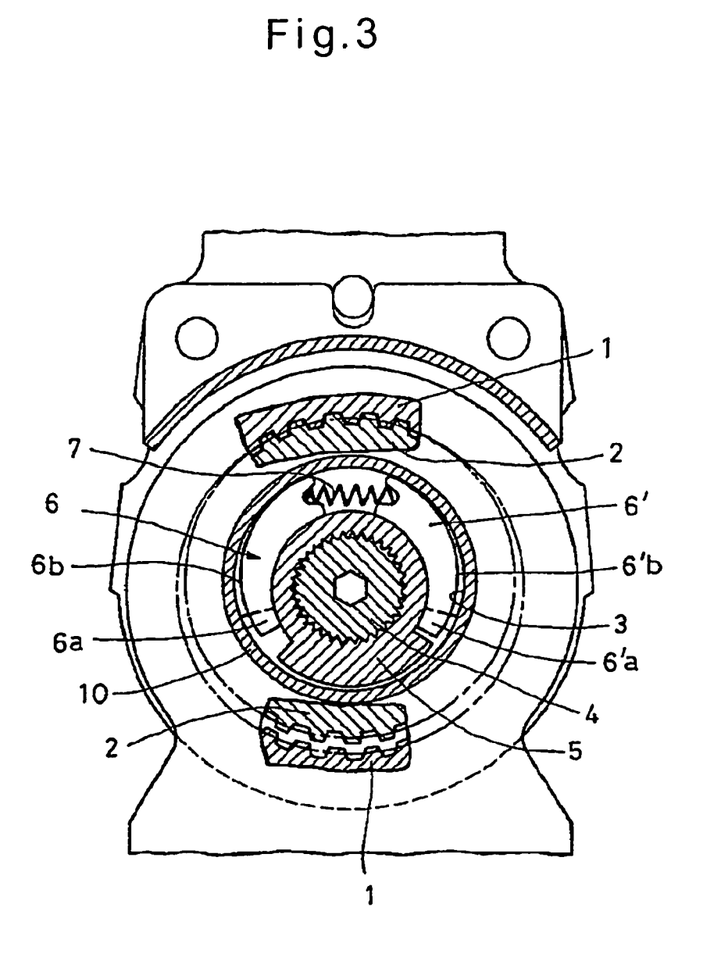
FIG. 3 is a partially cutaway sectional view of a reclining device of a second embodiment.

As shown in FIGS. 3 and 4, as in the first embodiment, the second embodiment is directed to a reclining device including a differential transmission mechanism for adjusting the opening angle of a hinge through which the seating portion and the backrest portion of a seat are coupled together. The differential transmission mechanism of this embodiment differs from the first embodiment in that a bearing bush 10 having a sliding surface formed of a resin is inserted in the shaft hole 3 of the external gear 2.

Thus, this differential transmission mechanism includes an internal gear 1, and an external gear 2 having a slightly smaller number of teeth than the internal gear 1 and meshing with the internal gear 1. An arcuate gap is defined between the bearing bush 10 and the small-diameter portion of the cam 5 integral with the shaft 4 of the internal gear 1. A pair of wedge-shaped pieces 6 and 6' are received in the arcuate gap such that their narrow, ends 6a and 6'a face in opposite directions. The radially outer surfaces 6b and 6'b of the wedge-shaped pieces 6 and 6', which serve as friction sliding surfaces, are made of a low-friction sliding material.

The wedge-shaped pieces 6 of this embodiment are of the same structure as those of the first embodiment, shown in FIG. 4. As for the friction sliding surface of each of the wedge-shaped piece 6, its radially outer surface 6b, which is brought into sliding contact with the bearing bush 10 of the external gear 2, and its radially inner surface 6c, which is brought into sliding contact with the cam 5, which is integral with the shaft 4 of the internal gear 1, are main friction sliding surfaces. In particular, high wear resistance is required for the radially outer surface 6b. A low-friction sliding material may also be formed on at least one of the other surfaces comprising the front end surface 6d, spring retaining recess 6e and a pair of opposed front (back) surfaces 6f.

As shown in FIG. 4, the bearing bush 10 used in this invention is only required that its sliding surface be made of a resin having sliding properties, and may be formed by (integrally) molding a resin, or may be a multilayered bearing formed by composite molding. For example, the bearing bush 10 may be a laminate comprising a back metal plate 10a made of steel or copper, a porous sintered layer 10b made of a sintered material such as copper alloy powder and superposed on the back metal plate 10a, and a resin layer 10c made of a resin composition having sliding properties and partially filling the pores of the porous sintered layer 10b, such a composition comprising e.g. a polytetrafluoroethylene resin containing 30 to 50% by weight of graphite powder.

The porous sintered layer 10b of the bearing bush 10 may be replaced with a flame-sprayed layer comprising a soft metal such as copper, nickel or aluminum for improved adhesiveness to the resin layer 10c. The bearing bush 10 has a sliding surface having sliding properties. Preferably, the back metal plate is laminated on and bonded to the resin layer through an intermediate layer (binder layer) having high adhesiveness to the resin.

Specific resins having sliding properties and usable for the above sliding surface include those used for the low-friction sliding material.

In this seat reclining device, when the differential transmission mechanism is operated to adjust the opening angle of the hinge through which the seating portion and the backrest portion of the seat are coupled together, the shaft 4 is rotated by operating e.g. a manual lever, so that the wedge-shaped pieces 6 and 6' are pushed by the cam 5 integral with the shaft 4 and slid in the arcuate gap, thereby moving the differential transmission mechanism into a position where the opening angle of the hinge is adjustable or into a position where the hinge is locked. During this switch-over process, the low-friction sliding materials on the radially outer surfaces 6b and 6'b of the wedge-shaped pieces 6 and 6' are brought into sliding contact with the bearing bush, thereby activating the differential transmission mechanism (Taumel mechanism).

At this time, the force that tends to peel off the surface of the resin layer 10c of the bearing bush 10 decreases due to the contact between the sliding surface, which is made of a resin, and the low-friction sliding materials. This minimizes the possibility of surface delamination of the resin layer, or peeling of the resin layer from the intermediate layer (binder layer) or the back metal plate as the substrate.

EXAMPLE 1 OF THE INVENTION

In Example 1 of the invention, a fluororesin film comprising polytetrafluoroethylene (PTFE) and having a thickness of 0.025 mm was formed over the entire surface of each wedge-shaped piece made of a ferrous sintered material by spray-coating the entire surface with a coating material comprising 100 parts by weight of PTFE, 90 parts by weight of polyamideimide resin as a binder resin, and 10 parts by weight of iron oxide as an additive (BEAREE FL7075; made by NTN Engineering Plastics Corporation), and then by baking it at about 230° C.

EXAMPLE 2 OF THE INVENTION

In Example 2 of the invention, a flame-sprayed copper layer comprising 95% copper and 5% tin was formed on the surface of each wedge-shaped piece made of a ferrous sintered material, and a fluororesin film comprising polytetrafluoroethylene (PTFE) and having a thickness of 0.025 mm was formed over the entire surface by spray-coating the entire surface with a coating material comprising 100 parts by weight of PTFE, 90 parts by weight of polyamideimide resin as a binder resin, and 10 parts by weight of iron oxide as an additive (BEAREE FL7075; made by NTN Engineering Plastics Corporation), and then by baking it at about 230° C.

EXAMPLE 3 OF THE INVENTION

In Example 3 of the invention, a flame-sprayed nickel layer was formed on the surface of each wedge-shaped piece made of a ferrous sintered material, and a fluororesin film comprising polytetrafluoroethylene (PTFE) and having a thickness of 0.025 mm was formed over the entire surface by spray-coating the entire surface with a coating material comprising 100 parts by weight of PTFE, 100 parts by weight of polyamideimide as a binder resin, and 20 parts by weight of graphite as an additive (BEAREE RCB; made by NTN Engineering Plastics Corporation), and then by baking it at about 230° C.

In Examples 1, 2 and 3 of the invention, in which the thus obtained wedge-shaped pieces are mounted in the seat reclining device shown in FIGS. 1 and 2, it is not necessary to press a slide bearing onto the outer periphery of the shaft of the internal gear 1 beforehand. Also, when the operating lever is turned and the wedge-shaped pieces 6 and 6' are pushed by the cam provided on the shaft of the internal gear, the wedge-shaped pieces can extremely smoothly slide. Thus, the external gear 2 quickly separates from the internal gear, thus making it possible to smoothly adjust the opening angle of the hinge.

EXAMPLE 4 OF THE INVENTION

In Example 4 of the invention, a primer comprising a tetrafluoroethylene-perfluoroalkylvinylether copolymer (PFA) and a polyimide resin was applied to the entire surface of each substrate comprising a wedge-shaped piece made of a ferrous sintered material and dried, and then a fluororesin film comprising PFA and having a thickness of 0.40 mm by spray-coating the entire surface with a coating material of which the major component is PFA (BEAREE FE7090; made by NTN Engineering Plastics Corporation), and by baking it at about 350° C.

EXAMPLE 5 OF THE INVENTION

In Example 5 of the invention, a flame-sprayed copper layer comprising 95% copper and 5% tin was formed on the surface of each wedge-shaped piece made of a ferrous sintered material and similar to the one used in Example 4 above, and a fluororesin film comprising polytetrafluoroethylene (PTFE) and having a thickness of 0.025 mm was formed over the entire surface by spray-coating the entire surface with a coating material comprising 100 parts by weight of PTFE, and 90 parts by weight of polyamideimide as a binder resin (BEAREE FL7030; made by NTN Engineering Plastics Corporation), and then by baking it at about 230° C.

EXAMPLE 6 OF THE INVENTION

In Example 6 of the invention, a flame-sprayed nickel layer was formed on the surface of each wedge-shaped piece made of a ferrous sintered material and similar to the one used in Example 4 above, and a fluororesin film comprising polytetrafluoroethylene (PTFE) and having a thickness of 0.025 mm was formed over the entire surface by spray-coating the entire surface with a coating material comprising 100 parts by weight of PTFE, 100 parts by weight of polyamideimide as a binder resin, and 20 parts by weight of graphite as an additive (BEAREE RCB; made by NTN Engineering Plastics Corporation), and then by baking it at about 230° C.

COMPARATIVE EXAMPLE 1

In Comparative Example 1, the surface of each wedge-shaped piece made of a ferrous sintered material and similar to Example 4 of the invention was finished by grinding.

In Examples 4 and 5 of the invention, in which the thus obtained wedge-shaped pieces are mounted in the seat reclining device shown in FIGS. 1 and 2, when the operating lever is turned and the wedge-shaped pieces 6 and 6' are pushed by the cam provided on the shaft of the internal gear, the wedge-shaped pieces can extremely smoothly slide. Thus, the external gear 2 quickly separates from the internal gear, thus making it possible to smoothly adjust the opening angle of the hinge.

As an endurance test, the respective wedge-shaped pieces were mounted in the reclining device shown in FIG. 3, and with a load of 20 kg applied to the device at its point spaced 300 mm from the center of the bearing, the device was subjected to a 7000-cycle reciprocating test with an operating angle of 30° and at an operating speed of 2°/second.

The bearing bush 10 comprises a ferrous steel back metal plate and a coating comprising a coating material of which the major component is polytetrafluoroethylene (PTFE) (BEAREE FL7075; made by NTN Engineering Plastics Corporation) and formed on the back metal plate through a flame-sprayed layer of a copper-tin alloy.

The endurance test revealed that, in Examples 4, 5 and 6 of the invention, while wear was observed for the fluororesin film layer of each wedge-shaped piece, there was no peeling of the resin layer of the bearing bush or no rise in torque. In Comparative Example 1, after about 5500 cycles, the test had to be stopped due to abnormal torque. When the bearing bush was observed, its resin layer was worn and peeled.

What is claimed is:

1. A seat reclining device comprising a differential transmission mechanism for adjusting an opening angle of a hinge through which a seating portion and a backrest portion of a seat are coupled together, said differential transmission mechanism comprising an internal gear, an external gear having a smaller number of teeth than said internal gear and meshing with said internal gear, said external gear having a shaft hole and said internal gear having a shaft, said shaft hole and said shaft defining an arcuate gap therebetween, a pair of wedge-shaped pieces received in said arcuate gap such that their narrow ends face in opposite directions to each other, a spring received in said arcuate gap and biasing said wedge-shaped pieces away from each other, whereby when said wedge-shaped pieces are pushed by a cam provided on said shaft of said internal gear and slide in said arcuate gap, said external gear is configured to separate from said internal gear, thereby making it possible to adjust the opening angle of the hinge;

characterized in that each of said wedge-shaped pieces is formed by integrally laminating a low-friction sliding material on a substrate through an intermediate layer.

2. The seat reclining device of claim 1 wherein said intermediate layer is a flame-sprayed metal layer.

3. The seat reclining device of claim 2 wherein the seat is one for a motor vehicle.

4. The seat reclining device of claim 1 wherein said low-friction sliding material is a resin formed into a film.

5. The seat reclining device of claim 4 wherein the seat is one for a motor vehicle.

6. The seat reclining device of claim 4 wherein said resin is a fluorine-series resin.

7. The seat reclining device of claim 6 wherein the seat is one for a motor vehicle.

8. The seat reclining device of claim 6 wherein said fluorine-series resin is a fluororesin composition comprising a binder resin to which a fluororesin is added.

9. The seat reclining device of claim 8 wherein the seat is one for a motor vehicle.

10. The seat reclining device of claim 8 wherein said fluororesin composition is a fluororesin composition containing at least one selected from graphite, molybdenum disulfide and metal oxides.

11. The seat reclining device of claim 10 wherein the seat is one for a motor vehicle.

12. The seat reclining device of claim 10 wherein said fluororesin composition is a fluororesin composition comprising 100 parts by weight of a fluororesin, 60 to 130 parts by weight of a binder resin, and 5 to 30 parts by weight of at least one selected from graphite, molybdenum and metal oxides.

13. The seat reclining device of claim 12 wherein the seat is one for a motor vehicle.

14. The seat reclining device of claim 1 further comprising a bearing bush having a sliding surface made of a resin and fixed to said shaft hole of said external gear.

15. The seat reclining device of claim 1 wherein the seat is one for a motor vehicle.

\* \* \* \* \*